United States Patent
Hua et al.

(10) Patent No.: US 7,782,847 B2
(45) Date of Patent: Aug. 24, 2010

(54) METHOD AND SYSTEM FOR VERIFYING CONNECTIVITY OF MULTI-SEGMENT PSEUDO-WIRES BY TRACING

(75) Inventors: Michael Nghia Hua, Ottawa (CA); Mustapha Aissaoui, Kanata (CA); Tiberiu Grigoriu, Ottawa (CA)

(73) Assignee: Alcatel Lucent, Paris (FR)

( * ) Notice: Subject to any disclaimer, the term of this patent is extended or adjusted under 35 U.S.C. 154(b) by 807 days.

(21) Appl. No.: 11/582,989

(22) Filed: Oct. 19, 2006

(65) Prior Publication Data

US 2008/0095061 A1    Apr. 24, 2008

(51) Int. Cl.
*H04L 12/28* (2006.01)
(52) U.S. Cl. .................................................. 370/389
(58) Field of Classification Search .............. None
See application file for complete search history.

(56) References Cited

U.S. PATENT DOCUMENTS

| 6,741,555 | B1 * | 5/2004 | Li et al. | 370/229 |
| 7,120,118 | B2 * | 10/2006 | Rajagopal et al. | 370/237 |
| 7,486,622 | B2 * | 2/2009 | Regan et al. | 370/236 |
| 2005/0243817 | A1 * | 11/2005 | Wrenn et al. | 370/389 |
| 2007/0180104 | A1 * | 8/2007 | Filsfils et al. | 709/224 |
| 2008/0080507 | A1 * | 4/2008 | Swallow et al. | 370/392 |

OTHER PUBLICATIONS

Hart, et al., VCCV Extensions for Segmented Pseudo-Wire, Network Working Group, Jun. 2006.
Martini, et al., Segmented Pseudo Wire, Network Working Group, Mar. 2006.
Anderson, et al., LDP Specification, Network Working Group, Jan. 2001.
Martini, et al., Pseudowire Setup and Maintenance Using the Label Distribution Protocol (LDP), Apr. 2006.
Thomas, et al., LDP Applicability, Network Working Group, Jan. 2001.
Kompella, et al., Detecting Multi-Protocol Label Switched (MPLS) Data Plane Failures, Feb. 2006.

* cited by examiner

*Primary Examiner*—Raj Jain
(74) *Attorney, Agent, or Firm*—Kramer & Amado P.C.

(57) ABSTRACT

A method for testing connectivity of a multi-segment pseudo-wire in a packet switched network, the method comprising: (a) sending an echo request message from a first provider edge device to a second provider edge device for a first segment of the multi-segment pseudo-wire between the first provider edge device and the second provider edge device; and, (b) receiving an echo reply message from the second provider edge device in response to the echo request message, the echo reply message: confirming connectivity of the first segment; indicating whether there is a second segment in the multi-segment pseudo-wire between the second provider edge device and a third provider edge device; and, if there is a second segment, including information pertaining to the second segment.

14 Claims, 3 Drawing Sheets

METHOD AND SYSTEM FOR VERIFYING CONNECTIVITY OF MULTI-SEGMENT PSEUDO-WIRES BY TRACING

FIELD OF THE INVENTION

This invention relates to the field of network management and service provisioning, and more specifically, to a method and system for verifying connectivity for multi-segment pseudo-wires in packet switched networks.

BACKGROUND OF THE INVENTION

Multiprotocol label switching ("MPLS") provides a mechanism for engineering network traffic patterns in which short labels are assigned to network packets that describe how to forward them through a network (e.g., a packet switched network ("PSN")). In a MPLS network, a node, switch or router which supports MPLS is generally known as a label switching router ("LSR") and a LSR at the edge (ingress or egress) of the MPLS network is generally known as a label edge router ("LER").

In general, as a data frame of a connectionless network layer protocol (e.g., the Internet Protocol ("IP")) travels from a source node to a destination node it travels from one node to the next through the network. Each node makes an independent forwarding decision for that packet. That is, each node analyzes the data frame's header to determine where to forward the packet next. The forwarding decision is determined by a forwarding table that is present on each node and that is built by network layer routing algorithms running on that node. Therefore each router independently chooses a next hop for the data frame, based on its analysis of the packet's header and the results of running the routing algorithm.

Frame headers contain considerably more information than is needed simply to choose the next hop along the path. Choosing the next hop can therefore be thought of as the combination of two functions. The first function partitions the entire set of possible packets into a set of forwarding equivalence classes ("FECs"). In conventional IP forwarding, the FEC is a subnet IP address prefix. Therefore, a particular node will typically consider two packets to be in the same FEC if there is some address prefix "X" in that router's routing tables such that "X" is the "longest match" for each packet's destination address. The second function maps each FEC to a next hop. Insofar as the forwarding decision is concerned, different packets which get mapped into the same FEC are indistinguishable. All data frames which belong to a particular FEC and which travel from a particular node will follow the same path (or if certain kinds of multi-path routing are in use, they will all follow one of a set of paths associated with the FEC). As the data frame traverses the network, each hop in turn re-examines the packet and matches it to a FEC in order to determine the next hop.

In MPLS, the assignment of a particular data frame to a particular FEC is done just once, as the data frame enters the network. The FEC to which the packet is assigned is encoded as a short fixed length value known as a "label". When a packet is forwarded to its next hop, the label is sent along with it; that is, the packets are "labeled" before they are forwarded. At subsequent hops, there is no further analysis of the data frame's network layer header. Rather, the label in the frame header is used as an index into a table on the node. The table entry specifies the next hop and a new label. The old label in the frame header is replaced with the new label and the data frame is forwarded to its next hop. Thus, in the MPLS forwarding paradigm, once a packet is assigned to a FEC, no further network layer header analysis is done by subsequent routers; all forwarding is driven by the labels.

For reference, the MPLS header is made up of a stack of 32 bit labels. The MPLS "label" is 20 bits long and is the identifier that is locally significant to the LSR. The "experimental bits" field is 3 bits long and is used to determine the quality of service ("QoS") that is to be applied to the data frame. The "stack" field takes one bit and is used to determine whether there is another label stack entry in the header. And, the time-to-live ("TTL") field is 8 bits long and is similar to the TTL field carried in the IP header and is used to determine how many hops the frame can traverse. The IP frame is encapsulated in with an MPLS header at the ingress edge of the MPLS network. At the egress edge, the IP frame is restored by removing the MPLS header.

The label distribution protocol ("LDP") is used to build and maintain MPLS label databases that are used to forward traffic through MPLS networks. The LDP is specified in Internet Engineering Task Force ("IETF") documents request for comment ("RFC") 3036, "LDP Specification", January 2001, and RFC 3037, "LDP Applicability", January 2001, which are incorporated herein by reference. As mentioned above, MPLS is a method for forwarding packets that uses short, fixed-length values carried by packets, called labels, to determine packet next hops. A fundamental concept in MPLS is that two LSRs must agree on the meaning of the labels used to forward traffic between and through them. This common understanding is achieved by using a set of procedures (i.e., the LDP) by which one LSR informs another of label bindings it has made. Thus, the LDP is a set of procedures by which one LSR informs another of the meaning of labels used to forward traffic between and through them.

Now, a pseudo-wire (or pseudowire or "PW") is an emulation of a native service over a packet switched network ("PSN"). The native service may be asynchronous transfer mode ("ATM"), Frame Relay, Ethernet, low-rate time-division multiplexing ("TDM"), or synchronous optical network/synchronous digital hierarchy ("SONET/SDH"), while the PSN may be a MPLS, IP, or Layer 2 tunneling protocol ("L2TP") based network. The PW emulates the operation of a "transparent wire" carrying the native service. In other words, a PW emulates a point-to-point link and provides a single service which is perceived by its user as an unshared link or circuit of the chosen service.

In general, a PW is a connection between two provider edge ("PE") devices which connects two attachment circuits ("ACs"). An AC can be a Frame Relay data link connection identifier ("DLCI"), an ATM virtual path identifier/virtual channel identifier ("VPI/VCI"), an Ethernet port, a virtual local area network ("VLAN"), a high-level data link control ("HDLC") link, a point-to-point protocol ("PPP") connection on a physical interface, a PPP session from an L2TP tunnel, an MPLS label switched path ("LSP"), etc. During the setup of a PW, the two PEs will be configured or will automatically exchange information about the service to be emulated so that later they know how to process packets coming from the other end. After a PW is set up between two PEs, frames received by one PE from an AC are encapsulated and sent over the PW to the remote PE, where native frames are re-constructed and forwarded over the other AC. The PE devices may be, for example, MPLS switches, LERs, or LSRs.

PW extensions to the LDP are described in IETF document RFC 4447, "Pseudowire Setup and Maintenance Using the Label Distribution Protocol (LDP)", April 2006, which is incorporated herein by reference. According to RFC 4447, Layer 2 services (such as Frame Relay, ATM, and Ethernet) can be "emulated" over an MPLS backbone by encapsulating the Layer 2 protocol data units ("PDUs") and transmitting them over PWs. In other words, PWs are created to carry different types of traffic across a MPLS network, the PW being a point-to-point network connection over MPLS that offers transparency of the Layer 2 service which it transports.

RFC 4447 specifies a protocol for establishing and maintaining PWs, using extensions to the LDP. It defines new type-length-values ("TLVs"), FEC elements, parameters, and codes for LDP, which enable LDP to identify PWs and to signal attributes of PWs. It specifies how a PW endpoint uses these TLVs in LDP to bind a demultiplexor field value (i.e., an MPLS label as described above) to a PW, and how it informs the remote endpoint of the binding. It also specifies procedures for reporting PW status changes, for passing additional information about the PW as needed, and for releasing the bindings.

Consider the following RFC 4447 scenario. Suppose that it is desired to transport Layer 2 PDUs from ingress LSR $PE_1$ to egress LSR $PE_2$, across an intervening MPLS-enabled network. Assume that there is an MPLS tunnel from $PE_1$ to $PE_2$. That is, assume that $PE_1$ can cause a packet to be delivered to $PE_2$ by encapsulating the packet in an "MPLS tunnel header" and sending the result to one of its adjacencies. The MPLS tunnel is a MPLS label switched path ("LSP"); thus, putting on an MPLS tunnel encapsulation is a matter of pushing on an MPLS label. Also suppose that a large number of PWs can be carried through a single MPLS tunnel. Thus, it is never necessary to maintain state in the network core for individual PWs. It is not presupposed that the MPLS tunnels are point-to-point; although the PWs are point-to-point, the MPLS tunnels may be multipoint-to-point. It is not presupposed that $PE_2$ will even be able to determine the MPLS tunnel through which a received packet was transmitted. (For example, if the MPLS tunnel is an LSP and penultimate hop popping is used, when the packet arrives at $PE_2$ it will contain no information identifying the tunnel.) When $PE_2$ receives a packet over a PW, it must be able to determine that the packet was in fact received over a PW, and it must be able to associate that packet with a particular PW. $PE_2$ is able to do this by examining the MPLS label that serves as the PW demultiplexor field. This label may by called the "PW label". When $PE_1$ sends a Layer 2 PDU to $PE_2$, it creates an MPLS packet by adding the PW label to the packet, thus creating the first entry of the label stack. If the PSN tunnel is an MPLS LSP, the $PE_1$ pushes another label (i.e., the tunnel label) onto the packet as the second entry of the label stack. The PW label is not visible again until the MPLS packet reaches $PE_2$. $PE_2$'s disposition of the packet is based on the PW label.

Thus, a PW is a point-to-point connection across an MPLS network identified by a stack of two labels. The first label is called the "outer" label. It represents the outer tunnel, or outer LSP. This outer tunnel is needed to transport the packets across the network. Within this outer tunnel, "inner" connections (i.e., PWs) may be multiplexed. Each of these inner connections is identified by a second label, usually called the "inner" label. The outer tunnel is usually signalled (i.e., labels exchanged, etc.) using a protocol such as LDP or the resource reservation protocol-traffic extension ("RSVP-TE"). The inner connection (i.e., the PW) is signalled using LDP in its downstream unsolicited ("DU") mode (i.e., "LDP-DU"). When LDP-DU mode is engaged, a LSR (e.g., a MPLS switch) can distribute MPLS label bindings to other LSRs that have not explicitly requested them. This label management behaviour is described in RFC 3036. Thus, the MPLS LDP-DU signalling protocol with PW extensions is thus used to establish bidirectional PWs across a MPLS network.

The PWs referred to above may also be referred to as single-segment pseudo-wires ("SS-PWs") as they are setup directly between two terminating PEs ("T-PEs"). Each direction of the SS-PW traverses one PSN tunnel that connects the two T-PEs. Thus, a T-PE is a PE where the customer-facing attachment circuits ("ACs") are bound to a PW forwarder. A PW may also have a number of segments. Such a PW may be referred to as a multi-segment pseudo-wire ("MS-PW"). Thus, a MS-PW is a static or dynamically configured set of two or more contiguous PW segments that behave and function as a single point-to-point PW. Each end of a MS-PW by definition terminates on a T-PE. That is, a T-PE is present in the first and last segments of a MS-PW. PEs located between T-PEs on a MS-PW are referred to as switching PEs ("S-PEs"). A S-PE is a PE capable of switching the control and data planes of the preceding and succeeding PW segments in a MS-PW. The S-PE terminates the PSN tunnels transporting the preceding and succeeding segments of the MS-PW. It is therefore a PW switching point for a MS-PW. A PW switching point is never the S-PE and the T-PE for the same MS-PW. A PW switching point runs necessary protocols to setup and manage PW segments with other PW switching points and T-PEs.

Now, as service providers ("SPs") deploy PW services, fault detection and diagnostic mechanisms particularly for the PSN portion of the network are pivotal. Specifically, the ability to provide end-to-end fault detection and diagnostics for an emulated PW service is an important consideration for SPs. The term virtual circuit connection verification ("VCCV") has been used to refer to a control channel that is associated with a SS-PW and to the corresponding operations and management functions such as connectivity verification to be used over that control channel. In general, VCCV defines a set of messages that are exchanged between PEs to verify connectivity of the SS-PW. To make sure that VCCV packets follow the same path as the SS-PW data flow, they are typically encapsulated with the same SS-PW demultiplexer and transported over the same PSN tunnel. For example, if MPLS is the PSN in use, then the same label shim header (and label stack) are typically incorporated. VCCV can be used both as a fault detection and/or a diagnostic tool for SS-PWs. An operator can periodically invoke VCCV for proactive connectivity verification on an active SS-PW, or on an ad hoc or as-needed as a means of manual connectivity verification. When invoking VCCV, the operator triggers a combination of one of its various connectivity check ("CC") types and one of its various connectivity verification ("CV") types. These include label switched path ("LSP"), L2TP, or Internet control message protocol ("ICMP") ping modes and are applicable depending on the underlying PSN. For reference, term "ping" refers to an operation that may be used to test connectivity in a network. A ping operation sends an echo request packet to an address, and then awaits a reply. The result of the ping operation can help SPs evaluate path-to-host reliability, delays over the path, and whether the host can be reached or is functioning. For example, a ping operation may be is based on ICMP traffic and may use public routing tables in order to get to the required destination (if it exists). For reference, IETF document RFC 4379, "Detecting Multi-Protocol Label Switched (MPLS) Data Plane Failures", February 2006, which is incorporated herein by reference, describes MPLS "echo requests" and "echo replys" for the purposes of fault detection and isolation for MPLS label switched paths ("LSPs").

However, for new MS-PW services, there is currently no effective method to easily pinpoint the point of failure and verify the end-to-end connectivity of a MS-PW. In particular, one problem with present MS-PW networks is that the control plane of the ingress node (i.e., the T-PE) of the MS-PW does not have access to the necessary information pertaining to the next segment of the MS-PW in order to format a VCCV echo request (or ping) and to allow for the successful validation of the echo request at the next segment of the MS-PW. While an operator of the network can manually perform a VCCV ping for each individual segment of the MS-PW one at a time, this is time consuming, not user-friendly, and requires the operator to have detailed knowledge of each segment of the whole MS-PW. In addition, such a manual approach may not even be possible if the operator does not have access to all the segments of the MS-PW (e.g., if the MS-PW spans the PSNs of different SPs).

A need therefore exists for an improved method and system for verifying connectivity of multi-segment pseudo-wires connections in packet switched networks. Accordingly, a solution that addresses, at least in part, the above and other shortcomings is desired.

SUMMARY OF THE INVENTION

According to one aspect of the invention, there is provided a method for testing connectivity of a multi-segment pseudo-wire in a packet switched network, the method comprising: (a) sending an echo request message from a first provider edge device to a second provider edge device for a first segment of the multi-segment pseudo-wire between the first provider edge device and the second provider edge device; and, (b) receiving an echo reply message from the second provider edge device in response to the echo request message, the echo reply message: confirming connectivity of the first segment; indicating whether there is a second segment in the multi-segment pseudo-wire between the second provider edge device and a third provider edge device; and, if there is a second segment, including information pertaining to the second segment.

The method may further include, if there is a second segment: (c) sending a second echo request message from the first provider edge device to the third provider edge device; and, (d) receiving a second echo reply message from the third provider edge device in response to the second echo request message, the second echo reply message: confirming connectivity of the second segment; indicating whether there is a third segment in the multi-segment pseudo-wire between the third provider edge device and a fourth provider edge device; and, if there is a third segment, including information pertaining to the third segment. The first provider edge device may have information pertaining to the first segment. The echo request message may include the information pertaining to the first segment. The second echo request message may include the information pertaining to the second segment. The packet switched network may be a multiprotocol label switching ("MPLS") network. The information pertaining to the first and second segments may include a type-length-value ("TLV") for a pseudo-wire forwarding equivalence class ("FEC"). The indicating whether there is a second segment in the multi-segment pseudo-wire between the second provider edge device and a third provider edge device may be facilitated by at least one of: the echo reply message including the information pertaining to the second segment; and, first and second return codes, wherein the first return code indicates that the second segment does exist, and wherein the second return code indicates that the second segment does not exist. The packet switched network may include first and second packet switched networks, wherein the first and second segments may be in the first and second packet switched networks, respectively, and wherein the first and second packet switched networks are controlled by first and second service providers, respectively. And, the second provider edge device may be a $k^{th}$ provider edge device, the third provider edge device may be a $(k+1)^{th}$ provider edge device, the first segment may be a $(k-1)^{th}$ segment of n segments of the multi-segment pseudo-wire between the first provider edge device and the $k^{th}$ provider edge device, the second segment may be a $k^{th}$ segment of the n segments of the multi-segment pseudo-wire between the $k^{th}$ provider edge device and the $(k+1)^{th}$ provider edge device, k and n are integers, k is less than or equal to n, and further comprising repeating steps (a) and (b) for k=3 to n.

In accordance with further aspects of the present invention there is provided an apparatus such as a data processing system (e.g., a MPLS router or switch, a network element, a network management system, etc.), a method for adapting this system, as well as articles of manufacture such as a computer readable medium having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the network elements and network management systems described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware.

Figure 1:
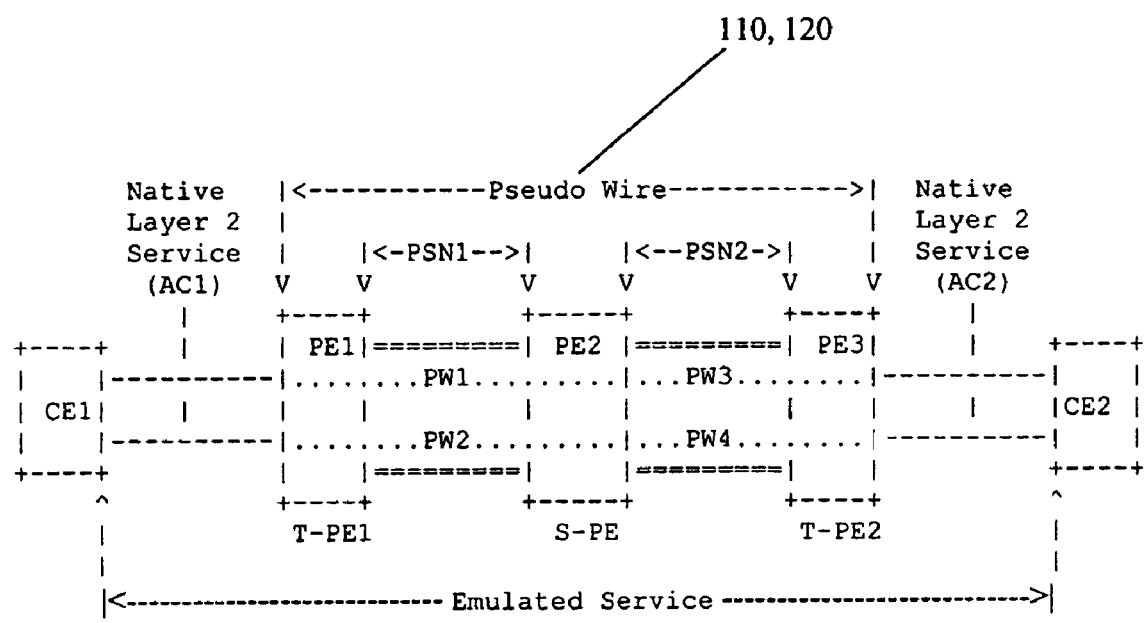
FIG. 1 is a block diagram illustrating a multi-segment pseudo-wire based communications network in accordance with an embodiment of the invention.

FIG. 1 is a block diagram illustrating a multi-segment pseudo-wire based communications network 100 in accordance with an embodiment of the invention. The communications network (or system) 100 includes a first provider edge ("PE") device PE1 coupled to a second PE device PE2 over a first packet switched network ("PSN") PSN1 via a first pseudo-wire ("PW") segment PW1. In addition, the second PE device PE2 is coupled to a third PE device PE3 over a second PSN network PSN1 via a third PW segment PW3. Customer edge ("CE") devices CE1, CE2 are coupled to respective PE devices PE1, PE3 by respective attachment circuits ("ACs") AC1, AC2. The PSN networks PSN1, PSN2 may be MPLS networks, IP networks, etc. The PE devices PE1, PE2, PE3 may be MPLS switches, nodes, elements, switches, routers, etc. The PE devices PE1, PE2, PE3 may be maintained by at least one service provider ("SP") to provide Layer 2 services to a subscriber or user via the CE devices CE1, CE2. According to one embodiment, the PE devices PE1, PE2, PE3 may be coupled to a network management system ("NMS") (not shown) for controlling and monitoring purposes. The NMS may be located at the SP's central office ("CO") or elsewhere.

Thus, PE1 and PE3 provide PW service to CE1 and CE2 and may be referred to as terminating PEs ("T-PEs") T-PE1, T-PE2. These PEs reside in different PSN domains, PSN1 and PSN2, respectively. A PSN tunnel extends from PE1 to PE2 across PSN1, and a second PSN tunnel extends from PE2 to PE3 across PSN2. PWs are used to connect the AC AC1 attached to PE1 to the corresponding AC AC2 attached to PE3. Each PW (i.e., PW1, PW2) on the tunnel across PSN1 is stitched to a PW (i.e., PW3, PW4) in the tunnel across PSN2 at PE2 to complete a multi-segment pseudo-wire ("MS-PW") 110, 120 between PE1 and PE3. PE2 is therefore the PW switching point and may be referred to as a PW switching provider edge ("S-PE") S-PE. PW1 and PW3 are segments of the same MS-PW 110 while PW2 and PW4 are segments of another MS-PW 120. PW segments (e.g., PW1 and PW3) of the same MS-PW (e.g., 110) may be of the same PW type or different type, and PSN tunnels (e.g., PSN1 and PSN2) may be the same or different technology. The S-PE switches a MS-PW (e.g., 110) from one segment to another based on the PW identifiers (e.g., PW label in case of MPLS PWs). Thus, FIG. 1 illustrates a MS-PW 110 providing connectivity from PE1 to PE3 (both T-PEs) through a switching point PE2 (an S-PE).

Figure 2:
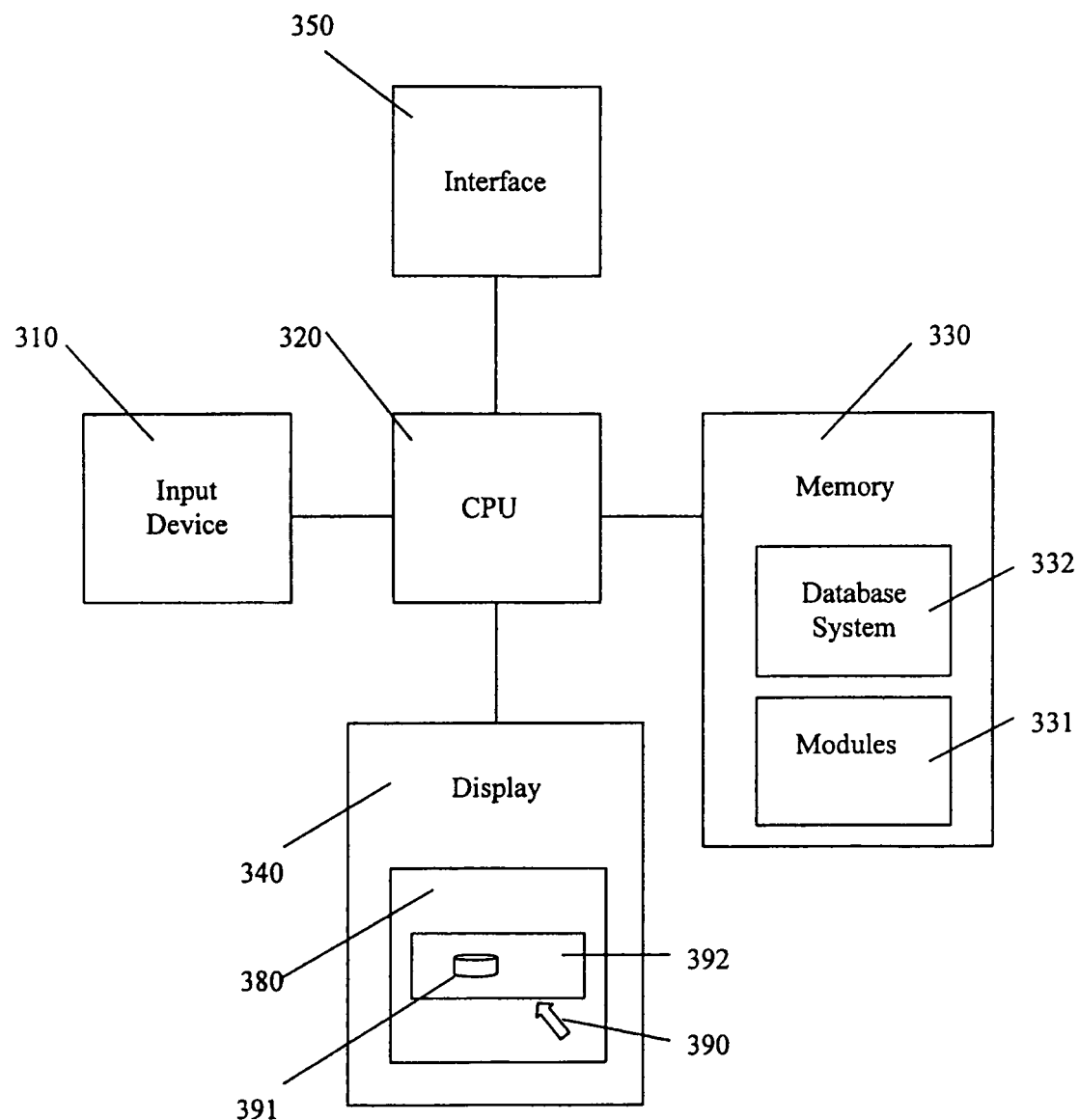
FIG. 2 is a block diagram illustrating a data processing system adapted to implement an embodiment of the invention; and, FIG. 3 is a flow chart illustrating operations of modules within the memory of a data processing system for testing connectivity of a multi-segment pseudo-wire in a packet switched network, in accordance with an embodiment of the invention.

FIG. 2 is a block diagram illustrating a data processing system 300 adapted to implement an embodiment of the invention. The data processing system 300 is suitable for operation as a PE device PE1, PE2, PE3, a CE device CE1, CE2, or a NMS. The data processing system 300 includes a central processing unit ("CPU") 320, memory 330, and an interface device 350 and may optionally include an input device 310 and a display 340. The CPU 320 may include dedicated coprocessors and memory devices. The CPU 320 is operatively coupled to memory 330 which stores an operating system (not shown) for general management of the system 300. The memory 330 may include RAM, ROM, disk devices, and databases. The memory 330 may include a variety of storage devices including internal memory and external mass storage typically arranged in a hierarchy of storage as understood to those skilled in the art. The interface device 350 may include one or more network connections. The data processing system 300 is adapted for communicating with other data processing systems (e.g., PE1 and PE3 for PE2) over a network 100, PSN1, PSN2 via the interface device 350. The input device 310 may include a keyboard, a mouse, a trackball, or a similar device. And, the display 340 may include a computer screen, terminal device, or a hardcopy producing output device such as a printer or plotter. The CPU 320 of the system 300 is typically coupled to one or more input devices 310 for receiving user commands or queries and for displaying the results of these commands or queries to the user on the display 340. Commands and queries may also be received over a network connection and results may be transmitted over a network connection. The data processing system 300 may include a database system 332 for storing and accessing network topology and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

Optionally, a user may interact with the data processing system 300 and its hardware and software modules 331 using an optional graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input or pointing device such as a mouse 310. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input or pointing device (e.g., a mouse) 310 to position a pointer or cursor 390 over an object 391 and by "clicking" on the object 391.

Typically, a GUI based system presents application, system status, and other information to the user in "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Thus, the data processing system 300 includes computer executable programmed instructions for directing the system 300 to implement the embodiments of the present invention. The programmed instructions may be embodied in one or more hardware modules or software modules 331 which may be resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable signal or signal-bearing medium that is uploaded to a network 100 by a vendor or supplier of the programmed instructions, and this signal or signal-bearing medium may be downloaded through an interface (e.g., 350) to the data processing system 300 from the network 100 by end users or potential buyers.

As mentioned above, for new MS-PW services, there is currently no effective method to easily pinpoint the point of failure and verify the end-to-end connectivity of a MS-PW (e.g., 110 comprised of PW1 and PW3). In particular, one problem with present MS-PW networks (e.g., 100) is that the control plane of the ingress node (e.g, T-PE1 for PW1) of the MS-PW 110 does not have access to the necessary information pertaining to the next segment (e.g., PW3) of the MS-PW 110 in order to format a VCCV echo request (or ping) and to allow for the successful validation of the echo request at the next segment PW3 of MS-PW 110. While an operator of the network 100 can manually perform a VCCV ping for each individual segment PW1, PW3 of the MS-PW 110 one at a time, this is time consuming, not user-friendly, and requires the operator to have detailed knowledge of each segment PW1, PW3 of the whole MS-PW 110. In addition, such a manual approach may not even be possible if the operator does not have access to all the segments PW1, PW3 of the MS-PW 110 (e.g., if the MS-PW 110 spans the PSNs PSN1, PSN2 of different SPs).

According to one embodiment of the invention, an automated VCCV trace method is provided that allows users (e.g., SP operators) to verify end-to-end connectivity and data paths for a MS-PW 110. If there is a failure, a user may easily pinpoint which segment PW1, PW3 is the cause of failure within the MS-PW 110 via a single operational command.

According to one embodiment, each target node or far-end (e.g., S-PE) of each segment (e.g., PW1) of a MS-PW (e.g., 110) responds to a VCCV echo request (e.g., from T-PE1) with an echo reply containing a return code of 8 (i.e., label switched at stack-depth), a FEC128 sub-TLV, and any other necessary information regarding the next segment (e.g., PW3). The originating node (e.g., T-PE1) of the initial echo request, upon receiving the echo reply with the FEC128 sub-TLV (e.g., from S-PE), then composes the next VCCV echo request with the received FEC128 sub-TLV and sends it to the next segment (e.g., PW3) of the MS-PW 110. These steps are then repeated for other segments (not shown) of the MS-PW 110. The destination node (e.g., T-PE2) of the MS-PW 110 or far-end of the last segment PW3 responds to a VCCV echo request with an echo reply that indicates a return code of 3 (i.e., egress router at stack-depth) and with no FEC128 sub-TLV. This indicates to the originating node (e.g., T-PE1) that this is the end of the MS-PW 110 and the method is completed. Advantageously, this method complies with the LSP ping infrastructure described in RFC 4379. In addition, this method functions regardless of the data path method employed to forward the VCCV echo packets through the MS-PW.

Thus, according to one embodiment, a VCCV trace can be performed on a MS-PW 110 originating from PE1 (or T-PE1) by a single operational command by the following method steps.

First, PE1 sends a VCCV echo request with a FEC128 sub-TLV containing PW information pertaining to the first PW segment PW1 (i.e., between PE1 and PE2) to PE2 (or S-PE) for validation. Note that TLVs are defined in section 7.2 of RFC 4379. The term "FEC128 sub-TLV" refers to "TLV Type 1, Sub-Type 9, Value Field 'FEC 128' Pseudowire (Deprecated)" or "TLV Type 1, Sub-Type 10, Value Field 'FEC 128' Pseudowire" as per section 7.2 of RFC 4379. (Note that a "TLV Type 1, Sub-Type 11, Value Field 'FEC 129' Pseudowire" as per section 7.2 of RFC 4379 may also be used.) For reference, within data communication protocols, optional information may be encoded as a type-length-value ("TLV") element inside of the protocol. The type and length fields are fixed in size (e.g., 1-4 bytes) and the value field is of variable size. These fields are used as follows: type—a numeric code which indicates the kind of field that this part of the message represents; length—the size of the value field (typically in bytes); and, value—variable sized set of bytes which contains data for this part of the message. Also for reference, a forwarding equivalence class ("FEC") is a term used in MPLS to describe a set of packets with similar or identical characteristics which may be forwarded in the same way, that is, they may be bound to the same MPLS label.

According to one embodiment, the TTL of the inner label controls the target S-PE for the echo request. According to one embodiment, the delivery of VCCV echo packets on the datapath can employ methods such as the use of the inner Vc label TTL as described in IETF draft document "VCCV Extensions for Segmented Pseudo-Wire" (draft-hart-pwe3-segmented-pw-vccv-00.txt), June 2006, which is incorporated herein by reference, or the use of the multi-hop TTL ("MH-TTL") as described in IETF draft document "Segmented Pseudo Wire" (draft-ietf-pwe3-segmented-pw-02.txt), March 2006, which is also incorporated herein by reference.

Second, PE2 validates the echo request with a FEC128 sub-TLV. Since it is a switching point (i.e., S-PE) between the first and second segments PW1, PW3 it builds an echo reply with a return code of 8 and a FEC128 sub-TLV for the second segment PW3 (i.e., between PE2 and PE3) and replies back to PE1. Note that return codes are defined in section 3.1 of RFC 4379. A return code of value 8 means "Label switched at stack depth <RSC>" while a return code of value 3 means "Replying router is an egress for the FEC at stack depth <RSC>" as per section 3.1 of RFC 4379. Note that "RSC" in the forgoing represents a return subcode that contains the point in the label stack where processing was terminated. If the RSC is zero, no labels were processed. Otherwise, the packet would have been label switched at depth RSC.

Third, PE1 builds a second VCCV echo request based on the FEC128 sub-TLV of the reply from PE2. PE1 then sends this second VCCV echo request to PE3.

Fourth, PE3 validates the echo request with the FEC128 sub-TLV from PE1. Since PE3 is the destination node or the egress node (i.e., T-PE2) of the MS-PW 110 it replies to PE1 with an echo reply that contains no FEC128 sub-TLV but with a return code of 3 (i.e., egress router).

Fifth, PE1 receives the echo reply from PE3. PE1 knows that PE3 is the destination of the MS-PW 110 because the echo reply does not contain a next FEC128 sub-TLV and because its return code is 3. The method then ends.

Note that in the above it is assumed that only a FEC128 sub-TLV is exchanged. However, the VCCV trace method may also use other TLVs or target FEC sub-TLVs (e.g., a FEC129, a LDP prefix, a RSVP LSP, etc.).

According to one embodiment, the method may be initiated by a user through the GUI 380 of the data processing system 300 (e.g., by entering a corresponding command, by clicking on an corresponding icon 391, by selecting a corresponding item from a menu, etc.) and the results of the method may be displayed to the user on the data processing system's display screen 340. According to another embodiment, the method may be initiated automatically.

According to one embodiment, the present invention supports control plane processing of an VCCV echo message in a MS-PW. The challenge for the control plane is to be able to build the VCCV echo request packet with the necessary information such as the target FEC 128 PW sub-TLV (FEC128) of the downstream PW segment to which the packet is destined. As mention above, this may be made even more difficult in that the MS-PW could span different SPs and autonomous systems. For example, and referring to FIG. 1, T-PE1 has the required information to compose the FEC128 of PW1 but it does not have the information required to compose the FEC128 of PW3 if VCCV echo request is supposed to be destined for T-PE2. This challenge can be overcome by the method described in the following.

With respect to receiving a VCCV echo request, upon receiving a VCCV echo request the S-PE (or the target node of each segment PW1, PW3 of the MS-PW 110) validates the request and responds to the request with an echo reply consisting of the FEC128 of the next downstream segment PW3 and a return code of 8 (i.e., label switched at stack depth) indicating that it is an S-PE and not the egress router for the MS-PW 110. If the node is T-PE2 or the egress node of the MS-PW 110, it responds to the echo request with an echo reply with a return code of 3 (i.e., egress router) and no FEC128 is included.

With respect to receiving a VCCV echo reply, the operations to be taken by the node (e.g., T-PE1) that receives the echo reply in response to its echo request depends on its current mode of operation such as "ping" or "trace". In "ping" mode, the node T-PE1 may choose to ignore the target FEC128 in the echo reply and report only the return code to the user (e.g., operator). However, in "trace" mode, the node T-PE1 builds and sends the subsequent VCCV echo request to the next downstream segment PW3 with the information (such as the downstream FEC128) it received in the echo reply.

With respect to VCCV trace operations, as an example, in FIG. 1, a VCCV trace can be performed on a MS-PW (e.g., 110) originating from T-PE1 by a single operational command. This may be accomplished by the following method steps. First, T-PE1 sends a VCCV echo request with a FEC128 containing the pseudo-wire information of the first segment (i.e., PW1 between T-PE1 and S-PE) to S-PE for validation. Second, S-PE validates the echo request with the FEC128. Since it is a switching point between the first and second segments PW1, PW3 it builds an echo reply with a return code of 8 and includes the FEC128 of the second segment (i.e., PW3 between S-PE and T-PE2) and sends the echo reply back to T-PE1. Third, T-PE1 builds a second VCCV echo request based on the FEC128 in the echo reply from S-PE. It sends the next echo request out to T-PE2. According to one embodiment, the VCCV echo request packet is switched at the S-PE data path and forwarded to the next downstream segment PW3 without any involvement from the control plane. Fourth, T-PE2 receives and validates the echo request with the FEC128 of PW3 from T-PE1. Since T-PE2 is the destination node or the egress node of the MS-PW 110 it replies to T-PE1 with an echo reply with a return code of 3 (i.e., egress router) and no FEC128 is included. Fifth, T-PE1 receives the echo reply from T-PE2. T-PE1 is made aware that T-PE2 is the destination of the MS-PW 110 because the echo reply does not contain the any FEC128 and its return code is 3. The trace method then ends. Note that the preceding example assumes only a FEC128 sub-TLV is exchanged but it is possible that the exchanged information could also involve other TLV or Target FEC sub-TLVs (e.g., FEC129, LDP Prefix, or RSVP LSP). Further detail with respect to the format of the VCCV echo packet may be found in RFC 4379.

Note that in general each S-PE in the network 100 needs to conform to the method described above to allow the VCCV trace to be end-to-end.

The present invention provides several advantages. First, it allows a user (e.g., a SP operator) to dynamically learn and validate both control and data paths of a MS-PW without prior knowledge of each SS-PW (i.e., each PW segment). Second, it is more efficient than manually pinging individual segments when diagnosing problems on a MS-PW. Third, it overcomes potential difficulties when dealing with MS-PWs that span different SP networks. Fourth, it is user-friendly and easy to use. And fifth, is provides an automated method to traverse a MS-PW segment by segment and to identify the point of failure with a single operational command.

Figure 3:
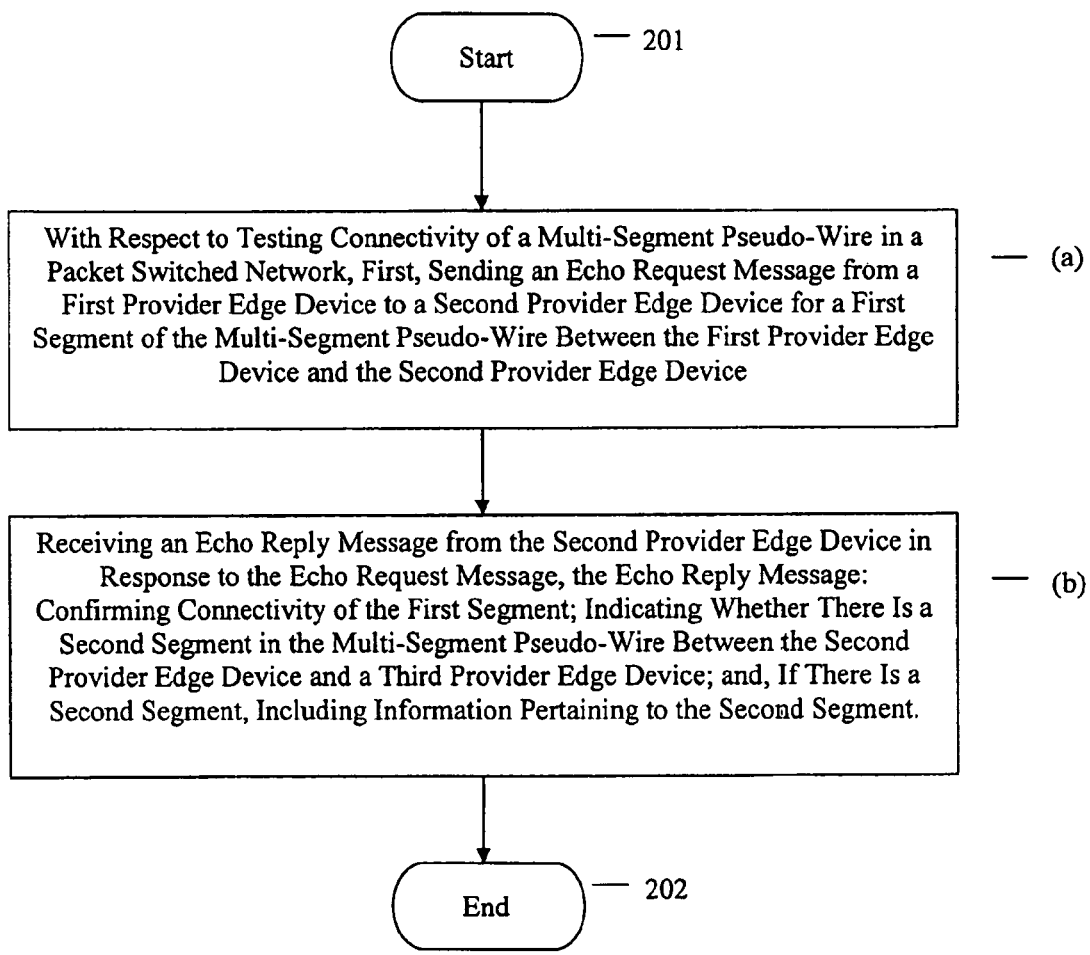

The above described method may be summarized with the aid of a flowchart. FIG. 3 is a flow chart illustrating operations 200 of modules 331 within the memory 330 of a data processing system 300 for testing connectivity of a multi-segment pseudo-wire 110 in a packet switched network 100, in accordance with an embodiment of the invention.

At step 201, the operations 200 start.

At step (a), an echo request message is sent from a first provider edge device PE1 to a second provider edge device PE2 for a first segment PW1 of the multi-segment pseudo-wire 110 between the first provider edge device PE1 and the second provider edge device PE2.

At step (b), an echo reply message is received from the second provider edge device PE2 in response to the echo request message, the echo reply message: confirming connectivity of the first segment PW1; indicating whether there is a second segment PW3 in the multi-segment pseudo-wire 110 between the second provider edge device PE2 and a third provider edge device PE3; and, if there is a second segment PW3, including information pertaining to the second segment PW3.

At step 202, the operations 200 end.

The method may further include, if there is a second segment PW3: (c) sending a second echo request message from the first provider edge device PE1 to the third provider edge device PE3; and, (d) receiving a second echo reply message from the third provider edge device PE3 in response to the second echo request message, the second echo reply message: confirming connectivity of the second segment PW3; indicating whether there is a third segment (not shown) in the multi-segment pseudo-wire 110 between the third provider edge device PE3 and a fourth provider edge device (not shown); and, if there is a third segment, including information pertaining to the third segment. The first provider edge device PE1 may have information pertaining to the first segment PW1. The echo request message may include the information pertaining to the first segment PW1. The second echo request message may include the information pertaining to the second segment PW3. The packet switched network 100 may be a multiprotocol label switching ("MPLS") network. The information pertaining to the first and second segments PW1, PW3 may include a type-length-value ("TLV") for a pseudo-wire forwarding equivalence class ("FEC"). The indicating whether there is a second segment PW3 in the multi-segment pseudo-wire 110 between the second provider edge device PE2 and a third provider edge device PE3 may be facilitated by at least one of: the echo reply message including the information pertaining to the second segment; and, first and second return codes, wherein the first return code (e.g., "8") indicates that the second segment PW3 does exist, and wherein the second return code (e.g., "3") indicates that the second segment PW3 does not exist. The packet switched network 100 may include first and second packet switched networks PSN1, PSN2, wherein the first and second segments PW1, PW3 may be in the first and second packet switched networks PSN1, PSN2, respectively, and wherein the first and second packet switched networks PSN1, PSN2 are controlled by first and second service providers, respectively. And, the second provider edge device PE2 may be a $k^{th}$ provider edge device, the third provider edge device PE3 may be a $(k+1)^{th}$ provider edge device, the first segment PW1 may be a $(k-1)^{th}$ segment of n segments of the multi-segment pseudo-wire 110 between the first provider edge device PE1 and the $k^{th}$ provider edge device, the second segment PW3 may be a $k^{th}$ segment of the n segments of the multi-segment pseudo-wire 110 between the $k^{th}$ provider edge device and the $(k+1)^{th}$ provider edge device, k and n are integers, k is less than or equal to n, and further comprising repeating steps (a) and (b) for k=3 to n.

According to one embodiment of the invention, the above described method may be implemented by a NMS (not shown) rather than by, or in combination with, the PEs PE1, PE2, PE3, 300.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 can be contained in a data carrier product according to one embodiment of the invention. This data carrier product can be loaded into and run by the data processing system 300. In addition, the sequences of instructions which when executed cause the method described herein to be performed by the data processing system 300 can be contained in a computer software product according to one embodiment of the invention. This computer software product can be loaded into and run by the data processing system 300. Moreover, the sequences of instructions which when executed cause the method described herein to be performed by the data processing system 300 can be contained in an integrated circuit product (e.g., hardware modules) including a coprocessor or memory according to one embodiment of the invention. This integrated circuit product can be installed in the data processing system 300.

The embodiments of the invention described above are intended to be exemplary only. Those skilled in this art will understand that various modifications of detail may be made to these embodiments, all of which come within the scope of the invention.

What is claimed is:

1. A method of testing connectivity of a multi-segment pseudo-wire in a packet switched network, the method comprising:
sending an echo request message from a first provider edge device to a second provider edge device for a first segment of the multi-segment pseudo-wire between the first provider edge device and the second provider edge device;
receiving an echo reply message from the second provider edge device in response to the echo request message, the echo reply message confirming connectivity of the first segment and having a return code of either a first value or a second value;
for the return code of the first value, indicating whether there is a second segment in the multi-segment pseudo-wire between the second provider edge device and a third provider edge device; and,
including pseudo-wire information pertaining to the second segment in the echo reply message, wherein the sending, receiving, and indicating steps are repeated for each subsequent segment in the multi-segment pseudo-wire until the return code of the second value is received, indicating termination of the multi-segment pseudo-wire.

2. The method of claim 1, wherein the first provider edge device has pseudo-wire information pertaining to the first segment.

3. The method of claim 2, wherein the echo request message includes the pseudo-wire information pertaining to the first segment.

4. The method of claim 3, wherein a second echo request message includes the pseudo-wire information pertaining to the second segment.

5. The method of claim 4, wherein the packet switched network is a multiprotocol label switching ("MPLS") network.

6. The method of claim 5, wherein the pseudo-wire information pertaining to the first and second segments includes a type-length-value ("TLV") for a pseudo-wire forwarding equivalence class ("FEC").

7. The method of claim 1, wherein the packet switched network includes first and second packet switched networks, wherein the first and second segments are in the first and second packet switched networks, respectively, and wherein the first and second packet switched networks are controlled by first and second service providers, respectively.

8. The method of claim 1, wherein the second provider edge device is a $k^{th}$ provider edge device, the third provider edge device is a $(k+1)^{th}$ provider edge device, the first segment is a $(k-1)^{th}$ segment of n segments of the multi-segment pseudo-wire between the first provider edge device and the $k^{th}$ provider edge device, the second segment is a $k^{th}$ segment of the n segments of the multi-segment pseudo-wire between the $k^{th}$ provider edge device and the $(k+1)^{th}$ provider edge device, k and n are integers, and k is less than or equal to n.

9. A system that tests connectivity of a multi-segment pseudo-wire in a packet switched network, the system comprising:
a processor coupled to memory and to an interface to the packet switched network; and,
modules within the memory and executed by the processor, the modules including:
a first module that sends an echo request message from a first provider edge device to a second provider edge device containing pseudo-wire information of a first segment of the multi-segment pseudo-wire between the first provider edge device and the second provider edge device; and,
a second module that:
receives an echo reply message from the second provider edge device in response to the echo request message, the echo reply message confirming connectivity of the first segment and containing a return code of either a first value or a second value;
for the return code of the first value, indicating whether there is a second segment in the multi-segment pseudo-wire between the second provider edge device and a third provider edge device; and,
receives pseudo-wire information pertaining to the second segment in the echo reply message,
wherein the first module and the second module repeat the sending, receiving, and indicating for each subsequent segment in the multi-segment pseudo-wire until the return code of the second value is received, indicating termination of the multi-segment pseudo-wire.

10. The system of claim 9, wherein second echo request message includes the pseudo-wire information pertaining to the second segment.

11. The system of claim 10, wherein the packet switched network is a multiprotocol label switching ("MPLS") network.

12. The system of claim 11, wherein the pseudo-wire information pertaining to the first and second segments includes a type-length-value ("TLV") for a pseudo-wire forwarding equivalence class ("FEC").

13. The system of claim 9, wherein the packet switched network includes first and second packet switched networks, wherein the first and second segments are in the first and second packet switched networks, respectively, and wherein the first and second packet switched networks are controlled by first and second service providers, respectively.

14. The system of claim 9, wherein the second provider edge device is a $k^{th}$ provider edge device, the third provider edge device is a $(k+1)^{th}$ provider edge device, the first segment is a $(k-1)^{th}$ segment of n segments of the multi-segment pseudo-wire between the first provider edge device and the $k^{th}$ provider edge device, the second segment is a $k^{th}$ segment of the n segments of the multi-segment pseudo-wire between the $k^{th}$ provider edge device and the $(k+1)^{th}$ provider edge device, k and n are integers, and k is less than or equal to n.

* * * * *